(12) United States Patent
Fildes et al.

(10) Patent No.: US 11,953,204 B2
(45) Date of Patent: Apr. 9, 2024

(54) AUTOMATIC BURNER CONTROL DELAY PERIOD SETTING FOR OIL BURNER

(71) Applicant: R.W. Beckett Corporation, North Ridgeville, OH (US)

(72) Inventors: Christopher Allen Fildes, North Ridgeville, OH (US); Benjamin Scott Anderson, North Ridgeville, OH (US); James Todd, III, Watertown, CT (US)

(73) Assignee: R.W. Beckett Corporation, North Ridgeville, OH (US)

( * ) Notice: Subject to any disclaimer, the term of this patent is extended or adjusted under 35 U.S.C. 154(b) by 356 days.

(21) Appl. No.: 17/238,406

(22) Filed: Apr. 23, 2021

(65) Prior Publication Data

US 2022/0341592 A1 Oct. 27, 2022

(51) Int. Cl.
*F23N 1/00* (2006.01)
*F23N 5/20* (2006.01)
*G01D 5/14* (2006.01)
*G05B 15/02* (2006.01)

(52) U.S. Cl.
CPC ............... *F23N 5/20* (2013.01); *F23N 1/002* (2013.01); *G01D 5/14* (2013.01); *G05B 15/02* (2013.01); *F23N 2227/02* (2020.01); *F23N 2227/04* (2020.01); *F23N 2235/12* (2020.01)

(58) Field of Classification Search
CPC ........ F23N 5/20; F23N 1/002; F23N 2227/04; F23N 2227/02; F23N 2235/12; G01D 5/14; G05B 15/02
USPC .......................................... 431/6, 12
See application file for complete search history.

(56) References Cited

U.S. PATENT DOCUMENTS

| | | | |
|---|---|---|---|
| 4,770,627 A * | 9/1988 | Yoshino | F23D 5/045 431/18 |
| 7,229,278 B1 | 6/2007 | Newberry | |
| 9,388,984 B2 | 7/2016 | Anderson | |
| 2002/0193890 A1* | 12/2002 | Pouchak | F23N 5/24 700/21 |
| 2017/0219209 A1* | 8/2017 | Suzuki | F23N 1/042 |

* cited by examiner

*Primary Examiner* — Avinash A Savani
(74) *Attorney, Agent, or Firm* — Eschweiler & Potashnik, LLC (57) ABSTRACT

Systems, methods, and circuitries are provided for a controller for a fuel oil burner system that controls a fuel oil burner to perform intermittent ON cycles. In one example, a controller includes a memory configured to store a value for one or more burner control delay periods and a processor. The processor is configured to perform an auto-set procedure in a first ON cycle. The auto-set procedure includes detecting an oil valve in the fuel oil burner; determining that the value for a burner control delay period is a default value; and in response, storing a valve-present value as the value for the burner control delay period in the memory.

21 Claims, 6 Drawing Sheets

AUTOMATIC BURNER CONTROL DELAY PERIOD SETTING FOR OIL BURNER

FIELD

The present disclosure relates to the field of fuel oil burners and in particular to fuel oil valves that control the flow of fuel oil in a burner system.

BACKGROUND

Some legacy fuel oil burners include a fuel oil pump that includes an internal flow control feature that allows fuel oil to flow only when centrifugal force generated by the fuel oil pump is sufficient. Most modern fuel oil burners include a separate oil valve that, when energized, allows fuel to flow into burner.

BRIEF DESCRIPTION OF THE DRAWINGS

Some examples of circuits, apparatuses and/or methods will be described in the following by way of example only. In this context, reference will be made to the accompanying Figures.

DETAILED DESCRIPTION

Figure 1:
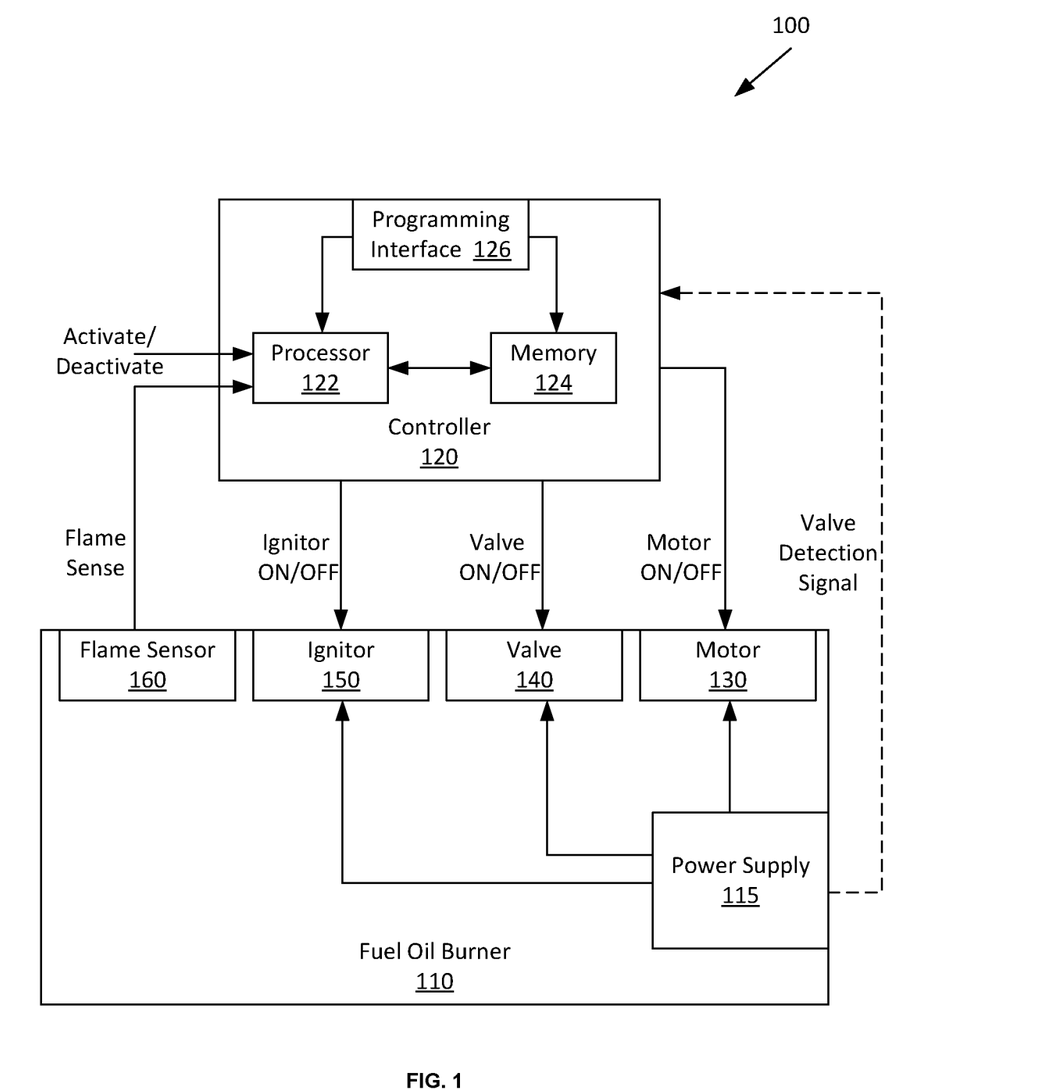
FIG. 1 is a block diagram of an exemplary fuel oil burner control system, in accordance with various aspects described.

FIG. 1 is a block diagram of an exemplary fuel oil burner system 100 that includes a fuel oil burner 110 and a controller 120. The fuel oil burner 110 includes a power supply 115 that provides regulated power to a motor 130, an oil valve 140, and an ignitor 150. The motor 130 drives a blower or fan (not shown) that moves air into a combustion chamber (not shown) containing air or other medium being heated by the fuel oil burner. The motor 130 may also drive a fuel oil pump (not shown) that pumps fuel oil to the valve 140.

The oil valve 140 controls flow of fuel oil to a nozzle (not shown) that atomizes the fuel for optimal combustion. For the purposes of this description the term "valve" will be used interchangeably with "oil valve" to refer to a separate oil valve as contrasted with an internal valve in a fuel oil pump. The valve 140 is controlled to operate in either an ON (fuel oil flowing to nozzle) or OFF (no fuel oil flowing to nozzle) mode. The valve 140 may be controlled with an electrical or electronic signal (supplied by the power supply 115) that, when provided to the valve, moves/maintains the valve in the ON mode. The absence of this "valve ON" signal may cause the valve to operate in the OFF mode.

The ignitor 150 is energized to provide a spark to ignite fuel oil being sprayed by the nozzle. Once the fuel oil is ignited, the ignitor 150 may be de-energized. A flame sensor 160 generates a flame sense signal that is indicative of whether a flame is present within the combustion chamber. Flame sense signals may be related to an amount of ultraviolet, visible, or infrared light that is present within the combustion chamber, the presence of gaseous combustion byproducts, and/or the temperature of the combustion chamber. One example flame sensor is a light sensitive cadmium sulfide (CAD) cell that exhibits a resistance that decreases as a level of ambient light increases. When the flame sensor 160 includes a CAD cell the flame sense signal may depend upon (e.g., have a voltage/current magnitude that is dependent upon) the resistance of the CAD cell.

The controller 120 controls operation of the fuel oil burner 110 in response to an activation signal that is generated by a thermostat or other system that determines whether heat from fuel oil burner is desired. The controller 120 includes a processor 122 and a computer-readable medium or memory 124. The memory 124 stores computer-executable instructions that, when executed by the processor 122, cause the process to perform corresponding operations for processing input signals such as the activation signal and the flame sense signal and in response providing control signals to the fuel oil burner 110. The memory 124 may also store parameter values that control various aspects of operation of the controller 120. For example, the memory 124 may store a value for a length of a valve ON delay period or a flame detection period. A programming interface 126 allows an external user to modify values stored in the memory 124 and/or operational settings of the processor. The programming interface 126 may be designed in accordance with an industry standard communication protocol.

Following are several flow diagrams outlining example methods. In this description and the appended claims, use of the term "determine" with reference to some entity (e.g., parameter, variable, and so on) in describing a method step or function is to be construed broadly. For example, "determine" is to be construed to encompass, for example, receiving and parsing a communication that encodes the entity or a value of an entity. "Determine" should be construed to encompass accessing and reading memory (e.g., lookup table, register, device memory, remote memory, and so on) that stores the entity or value for the entity. "Determine" should be construed to encompass computing or deriving the entity or value of the entity based on other quantities or entities. "Determine" should be construed to encompass any manner of deducing or identifying an entity or value of the entity.

Figure 2:
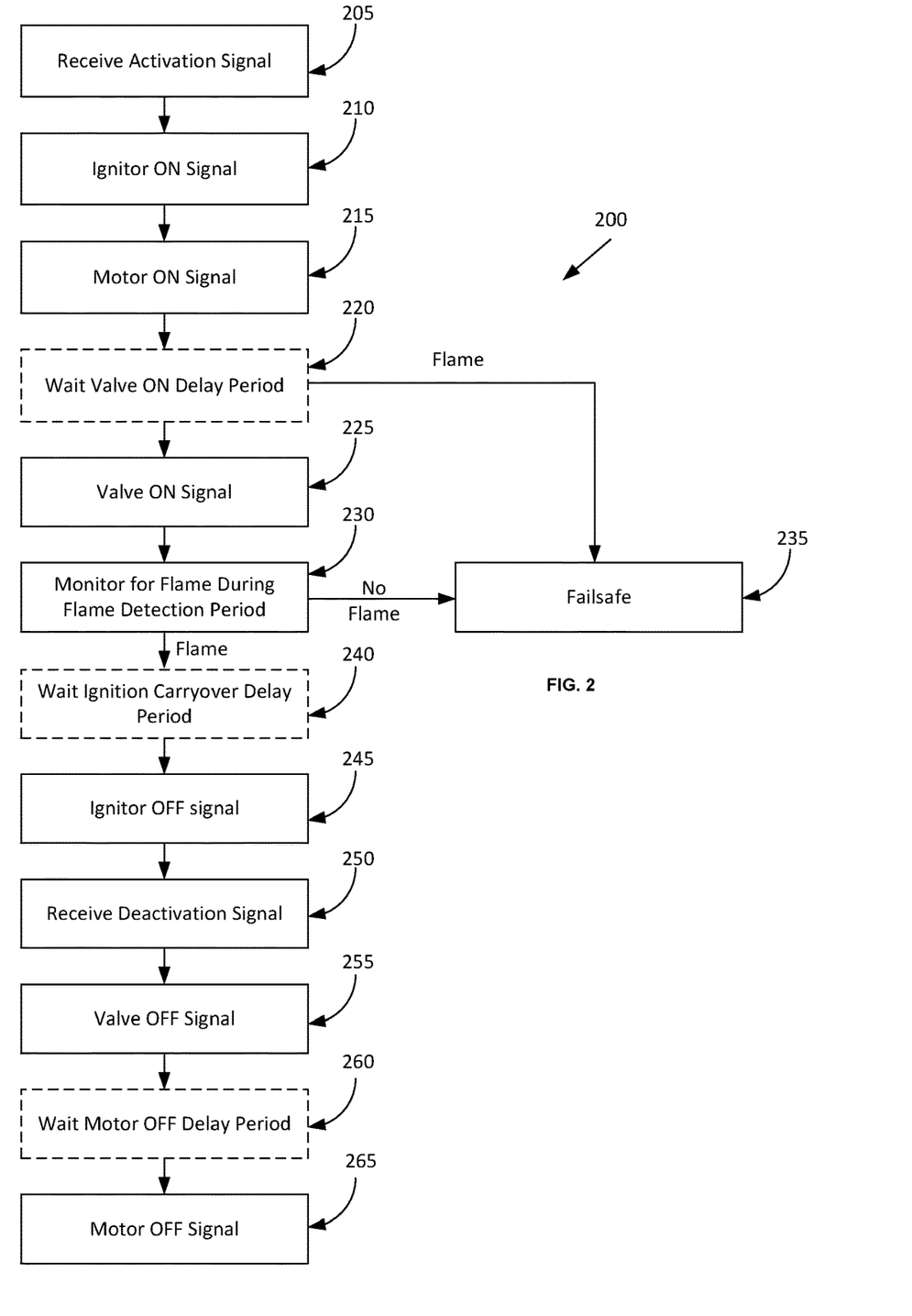
FIG. 2 is a flow diagram outlining an exemplary fuel oil burner control method, in accordance with various aspects described.

FIG. 2 outlines an exemplary burner control method 200 that may be performed by the controller 120. At 205 the activation signal, or "call for heat", is received. In response, the control method performs an ON cycle as follows. At 210, the ignitor ON signal is provided to the fuel oil burner so that the ignitor generates a spark and at 215 the motor ON control signal is provided to the fuel oil burner which will cause the blower and fuel oil pump to begin operation. In one example, the ignitor ON signal and motor ON signal are simply power supplied by the controller 120 to the ignitor and motor, respectively and the ignitor OFF signal and the motor OFF signal are the absence of power being supplied to the ignitor and motor, respectively.

At 220, an optional valve ON delay period is observed prior to providing the valve ON control signal to the fuel oil burner at 225. In one example, the valve ON signal is simply power supplied by the controller 120 to the oil valve 140 and the valve OFF signal is the absence of power being supplied to the oil valve. The valve ON delay period allows the fuel oil pump to build sufficient pressure for proper atomization of the fuel oil as soon as the valve is opened. The valve ON delay period also allows for a period of time during which the blower is moving air through the combustion chamber prior to lighting the burner to perform a "pre-purge" operation. If flame is detected during the valve ON delay period, a failsafe feature is activated at 235 such as locking out the fuel oil burner.

After causing the valve to open, at 230 the controller monitors the flame sense signal to determine whether a flame is present in the combustion chamber. There are many different techniques that may be used to sense the presence of flame based on the flame sense signal, the details of which are omitted here for the sake of brevity. If, after the flame detection period has expired, a flame has not yet been detected at 235 the failsafe feature, such as locking out the burner, is activated. If a flame is detected within the detection period at 240 the controller waits an optional ignition carryover delay period before providing the ignitor OFF control signal at 245. At this point in the control method the fuel oil burner system is providing heat in steady state operation.

The fuel oil burner system continues to provide heat until at 250 the controller receives a deactivation signal (which may be an affirmative deactivation signal or the absence of the activation signal). In response to the deactivation signal, the control method performs an OFF cycle as follows. At 255 the controller provides the valve OFF signal to stop the flow of fuel oil to the nozzle which will extinguish the flame. At 260 an optional motor OFF delay period is observed in which the motor continues to power the blower so that clean air flushes out the combustion chamber. This motor OFF delay period is sometimes called post-purge and the length of the period may be dependent on the size or flow characteristics of the combustion chamber. Like the valve ON delay period, the motor OFF delay period is useful only when there is an oil valve in the fuel oil burner. At 265, after waiting for expiration of the motor OFF delay period, the controller provides the motor OFF signal. At this point the fuel oil burner is inactive and the controller is monitoring for the activation signal.

When a fuel oil burner is equipment with an oil valve (as contrasted with an integral centrifugal valve in the fuel oil pump), it is beneficial to observe the valve ON delay period 220. Observation of the valve ON delay period allows the fuel oil to be sufficiently pressurized by the fuel pump for proper atomization prior to being provided to the nozzle, which improves the quality of combustion. Further, the possibility that un-atomized fuel oil, which may not ignite, enters and pools in the combustion chamber increases when the valve ON delay period is not observed.

In some circumstances a fuel oil burner may be equipped with an oil valve but have a valve ON delay period or motor OFF delay period set to 0 or some default value that does not reflect or recognize that the fuel oil burner has an oil valve. This may occur when a technician installs the fuel oil burner system without manually setting the valve ON delay period and/or motor OFF delay period. An insufficient valve ON delay period may result in a fuel oil burner that becomes fouled more often and wastes fuel oil over the life of the system. Likewise, an insufficient motor OFF delay period means that the fuel oil burner system will not benefit from the purging of combustion gases from the combustion chamber. For the purposes of this description, the term burner control delay period will be used as a shorthand notation for the valve ON delay period and/or the motor OFF delay period.

The following description outlines systems, methods, and circuitries that enable a fuel oil burner controller to detect the presence of an oil valve in a fuel oil burner and automatically set a valve ON delay period and/or a motor OFF delay period or any other valve-dependent control setting without any intervention by an external user.

Figure 3:
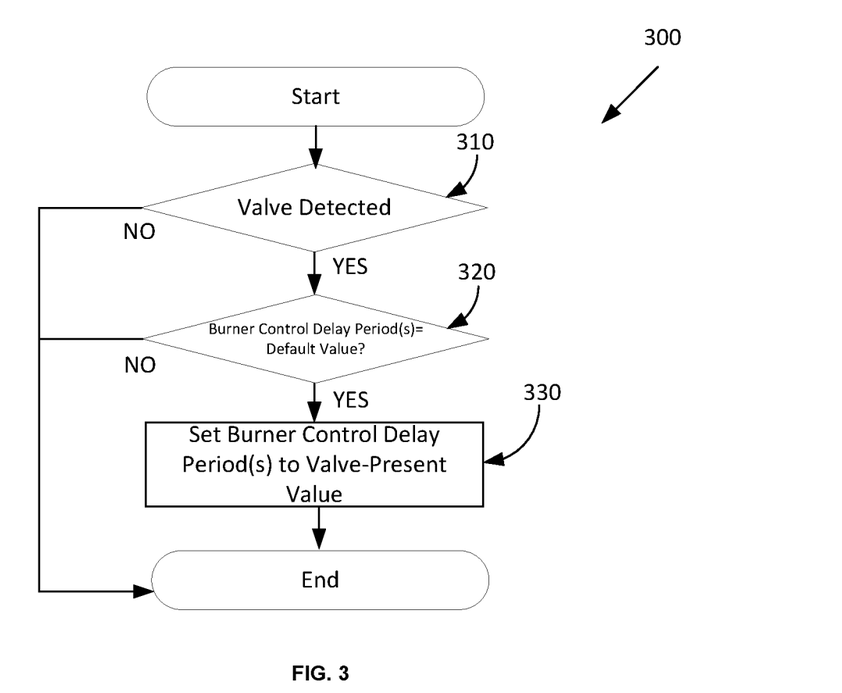
FIG. 3 is a flow diagram outlining an exemplary burner control delay period automatic setting method, in accordance with various aspects described.

FIG. 3 is a flow diagram outlining an exemplary burner control delay period auto-set method or procedure 300 for automatically (i.e., without human intervention) setting a burner control delay period for a fuel oil burner system. The method 300 may be performed by the controller 120 of FIG. 1 to set a valve ON delay period and/or a motor OFF delay period for the burner system. At 310, a determination is made as to whether an oil valve is detected in the fuel oil burner. Recall that in some fuel oil burners the fuel oil valve is an integral feature of the fuel oil pump and thus some fuel oil burners do not include an oil pump. If no oil valve is detected, the method 300 ends.

Referring to FIG. 1, in one example, the determination or automatic detection of an oil valve is performed based on an amount of current that is drawn by the fuel oil burner. Regardless of the setting for the burner control delay period, the oil valve 140 will be energized at some point soon after the activation signal is received in response to the controller providing the valve ON signal. When the oil valve 140 is energized the current drawn by the fuel oil burner 110 increases to a level above that immediately prior to energizing the oil valve. An example oil valve draws about 40-80 mA. The controller 120 monitors a valve detection signal indicative of the current draw of the fuel oil burner 110. The valve detection signal may be a signal that is used by the controller 120 to monitor the current draw of the fuel oil burner for other purposes as well.

In one example, to detect an oil valve, the controller 120 compares a current draw (as indicated by the valve detection signal) of the power supply 115 to some threshold that is derived based on the current drawn by a typical fuel oil burner without an oil valve. When the current draw is over the threshold, the presence of an oil valve is detected. In one example the controller 120 analyzes the valve detection signal to see if the current draw or some other characteristic of the fuel oil burner changes coincident with the controller providing the valve ON signal to detect an oil valve.

Returning to FIG. 3, if an oil valve is detected at 310 then at 320 a determination is made as to whether the burner control delay period is set to a default value. For the purposes of this description, the default value is a value that is used when the fuel oil burner does not include an oil valve. Often, the default value will be zero. However, the default value can be any value that indicates that the burner control delay period has not been set to compensate for the presence of an oil valve. In one example, if either the valve ON delay period or the motor OFF delay period are set to a default value (which may be different for each parameter) then it is determined that the burner control delay period is set to the default value at 320.

In one example, the valve ON delay period value and motor OFF delay period value are stored in the memory 124 (FIG. 1) and read by the processor 122 to determine whether the valve ON delay period or motor OFF delay period value is set to the default value. The value for the valve ON delay period may be used to initialize a timer used by the controller to set a time period between providing the motor ON signal and providing the valve ON signal. The value for the motor OFF delay period may be used to initialize a timer used by the controller to set a time period between providing the valve OFF signal and providing the motor OFF signal. The default value for each burner delay control period may be stored in the memory 124 so that the value of each burner delay control period can be compared to the stored default value. If the burner control delay period is not set to the default value, the method 300 ends.

If the burner control delay period is set to the default value, then at 330 the burner control delay period is set to a "valve-present" value. For the valve ON delay period the valve-present value provides appropriate delay for the fuel oil pump to develop sufficient pressure prior to opening the oil valve. For the motor OFF delay period the valve-present value provides appropriate delay for the combustion chamber to be purged of combustion gas at the end of an ON cycle. In one example, the processor 122 sets a burner control delay period by storing the valve-present value as the value for the burner control delay period in the memory 124. The valve-present value for each burner control delay period may be programmable and stored in the memory 124 (FIG. 1). Several optional valve-present values may be stored in memory and the valve-present value may be selected by the controller based on characteristics of the fuel oil burner system.

Figure 4:
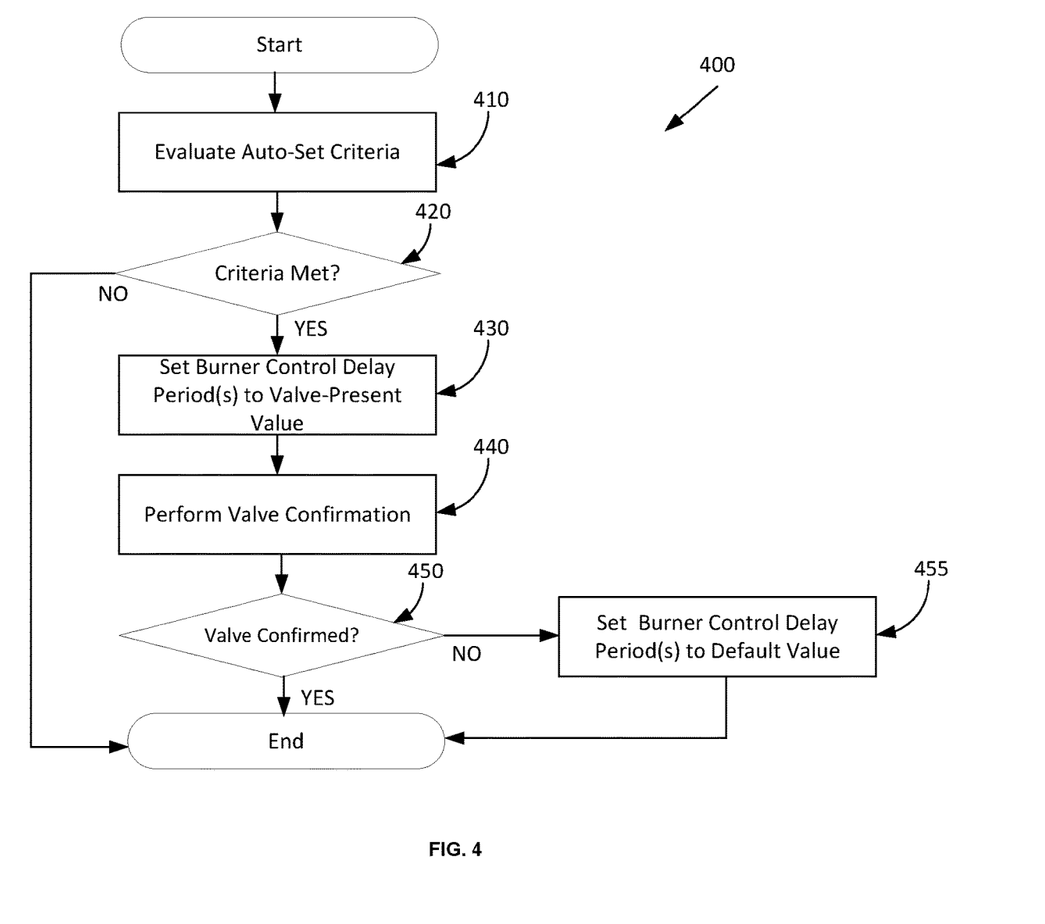
FIG. 4 is a flow diagram outlining an exemplary burner control delay period automatic setting method, in accordance with various aspects described.

FIG. 4 is a flow diagram outlining an exemplary valve delay ON period auto-set method or procedure 400 for performing the auto-set operation 310 through 330 of FIG. 3. The method 400 may be performed by the controller 120 of FIG. 1 immediately subsequent to providing the valve ON signal at 225 of FIG. 2. If the auto-set criteria are met the burner control delay period(s) will be set to the valve-present value for the next ON cycle.

At 410 a set of valve ON delay auto-set criteria are checked. Example criteria include that an oil valve is detected and that a burner control delay period is set to a default value. Further examples of valve ON delay auto-set criteria will be described with reference to FIG. 5. At 420 if the criteria are not met, the method ends. If the criteria are met, at 430, the burner control delay period(s) are set to a valve-present value. At 440, a valve confirmation is performed to confirm the presence of the valve and determine that the fuel oil burner functions properly with the burner control delay periods set to the valve-present value. The valve confirmation 440 may be performed in a next ON cycle. An example valve confirmation procedure is outlined with reference to FIG. 5.

At 450 if the presence of the oil valve is confirmed, the method ends and the burner control delay value(s) are maintained at valve-present value. If the presence of the oil valve is not confirmed, at 455 the valve burner control delay value(s) are set back to the default value and the method ends.

Figure 5:
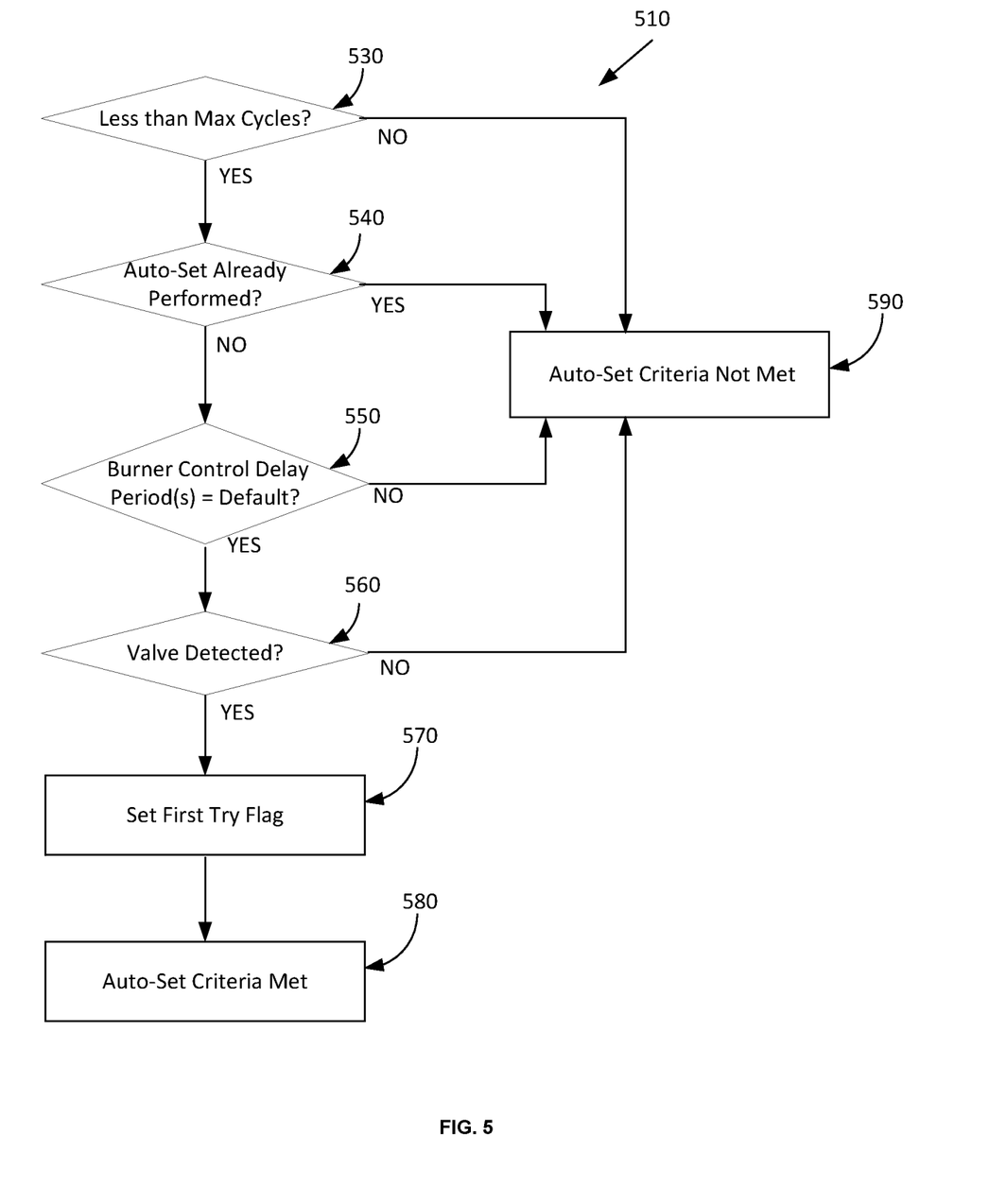
FIG. 5 is a flow diagram outlining an exemplary burner control delay period automatic setting criteria determination method, in accordance with various aspects described.

FIG. 5 is a flow diagram outlining an exemplary method 510 for performing the auto-set criteria evaluation operation 410 and 420 of FIG. 4. At 530 at determination is made as to whether the fuel oil burner system has performed less than some maximum threshold number of ON cycles. If the fuel oil burner system has performed more than the maximum threshold, at 590 it is determined that the auto-set criteria are not met. This criteria is useful for preventing unexpected changing of the burner control delay period(s) due to changes in burner function as the system breaks in or experiences normal wear and tear.

At 540, a determination is made as to whether the auto-set method (e.g., the method 300 or 400) has been performed. This determination may be made by checking an auto-set flag that is set when the auto-set method is performed the first time. If the auto-set method has already been performed, at 590 it is determined that the auto-set criteria are not met. This criteria prevents fouling that might be caused by repeated automatic setting of the valve ON delay period to a valve-present value when a valve is erroneously detected.

At 550, a determination is made as to whether the value for a burner control delay period is set to a default value. If a burner control delay period not set to the default value (which means the burner control delay period(s) have already been set based on oil valve presence), at 590 it is determined that the auto-set criteria are not met. At 560, a determination is made as to whether an oil valve is present in the burner. If no oil valve is detected, at 590 it is determined that the auto-set criteria are not met. If an oil valve is detected then at 570 a first try flag is set, which is used for during a valve confirmation procedure, an example of which is outlined in FIG. 6. At 580, it is determined that the auto-set criteria are met and the method 400 continues to 430 (FIG. 4) to set the burner control delay period value(s) to the valve-present value.

Figure 6:
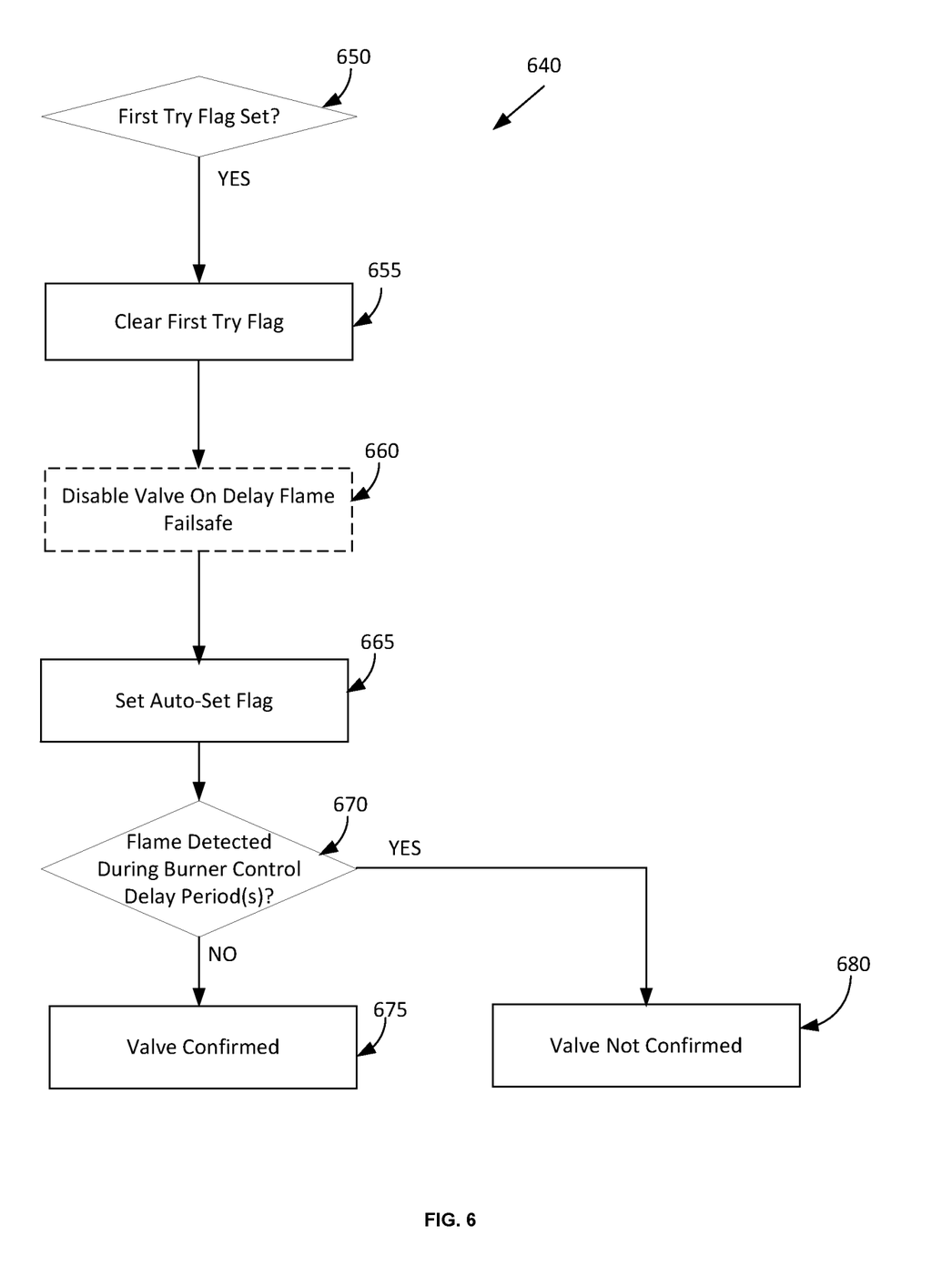
FIG. 6 is a flow diagram outlining an exemplary burner control delay period automatic setting confirmation method, in accordance with various aspects described.

FIG. 6 is a flow diagram outlining an exemplary method 640 for performing the valve confirmation operation 440 and 450 of FIG. 4. In one example, the method 640 is performed at the initiation of each ON cycle prior to providing control signals to the burner so that the valve confirmation check is performed in an ON cycle that is immediately subsequent to the ON cycle in which the valve ON delay period was set to the valve-present value. At 650, a determination is made as to whether the first try flag is set. Recall that the first try flag is set after it is determined that the auto-set criteria have been met and the valve ON delay period is set to the valve-present value.

At 655, the first try flag is cleared so that the burner function check method 640 will not be performed in the following ON cycle. At 660, the failsafe for detection of a flame during the valve ON delay period (see FIG. 2) is optionally disabled. This disabling of the flame failure failsafe prevents a nuisance lockout during the single ON cycle in which a flame may be detected during the valve ON delay period. At 665 an auto-set flag is set to indicate that the auto-set procedure has been performed. Recall from FIG. 5 that once the auto-set flag is set, the auto-set procedure will not be performed again.

At 670, a determination is made as to whether there is flame in the combustion chamber during the burner delay period(s) (e.g., the valve ON delay period and/or the motor OFF delay period). If no flame is detected, this confirms that there is an oil valve in the burner. At 675 it is determined that the presence of the oil valve is confirmed and the method 400 will maintain the valve ON delay period setting as the valve-present value. If flame is detected during the valve ON delay period and/or motor OFF delay period, this means there is no oil valve present (i.e., the valve is integral to the fuel oil pump). At 680 it is determined that the oil valve is not confirmed and the method 400 will reset the burner control delay period value(s) to the default value.

While the flow diagrams of FIGS. 2-6 illustrate a certain set and order of steps, it is to be understood that different orders of steps and methods that include additional or fewer steps may be used to perform the described valve ON delay period auto-set procedures as well. Further, while in some contexts both the valve ON delay period and the motor OFF delay period are described as being automatically set when an oil valve is detected, it is to be understood that either of these burner control delay periods may be automatically set independently of the other.

It can be seen from the foregoing description that the described automatic setting of a burner control delay period to an appropriate value when an oil valve is present in a fuel oil burner guards against technician error and improves the likelihood that a fuel oil burner system is set up to burn as efficiently and cleanly as possible.

While the invention has been illustrated and described with respect to one or more implementations, alterations and/or modifications may be made to the illustrated examples without departing from the spirit and scope of the appended claims. In particular regard to the various functions performed by the above described components or structures (assemblies, devices, circuits, circuitries, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the invention.

In the present disclosure like reference numerals are used to refer to like elements throughout, and wherein the illustrated structures and devices are not necessarily drawn to scale. As utilized herein, terms "module", "component," "system," "circuit," "circuitry," "element," "slice," and the like are intended to refer to a computer-related entity, hardware, software (e.g., in execution), and/or firmware. For example, circuitry or a similar term can be a processor, a process running on a processor, a controller, an object, an executable program, a storage device, and/or a computer with a processing device. By way of illustration, an application running on a server and the server can also be circuitry. One or more circuitries can reside within a process, and circuitry can be localized on one computer and/or distributed between two or more computers. A set of elements or a set of other circuitry can be described herein, in which the term "set" can be interpreted as "one or more."

As another example, circuitry or similar term can be an apparatus with specific functionality provided by mechanical parts operated by electric or electronic circuitry, in which the electric or electronic circuitry can be operated by a software application or a firmware application executed by one or more processors. The one or more processors can be internal or external to the apparatus and can execute at least a part of the software or firmware application. As yet another example, circuitry can be an apparatus that provides specific functionality through electronic components without mechanical parts; the electronic components can include field gates, logical components, hardware encoded logic, register transfer logic, one or more processors therein to execute software and/or firmware that confer(s), at least in part, the functionality of the electronic components.

It will be understood that when an element is referred to as being "electrically connected" or "electrically coupled" to another element, it can be physically connected or coupled to the other element such that current and/or electromagnetic radiation can flow along a conductive path formed by the elements. Intervening conductive, inductive, or capacitive elements may be present between the element and the other element when the elements are described as being electrically coupled or connected to one another. Further, when electrically coupled or connected to one another, one element may be capable of inducing a voltage or current flow or propagation of an electro-magnetic wave in the other element without physical contact or intervening components. Further, when a voltage, current, or signal is referred to as being "applied" to an element, the voltage, current, or signal may be conducted to the element by way of a physical connection or by way of capacitive, electro-magnetic, or inductive coupling that does not involve a physical connection.

Use of the word exemplary is intended to present concepts in a concrete fashion. The terminology used herein is for the purpose of describing particular examples only and is not intended to be limiting of examples. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof. As used herein the term "or" includes the option of all elements related by the word or. For example A or B is to be construed as include only A, only B, and both A and B. Further the phrase "one or more of" followed by A, B, or C is to be construed as including A, B, C, Aft AC, BC, and ABC

What is claimed is:

1. A controller for a fuel oil burner system that controls a fuel oil burner to perform intermittent ON cycles,
the controller comprising:
   a memory configured to store a value for a burner control delay period, wherein the burner control delay period is an amount of time between energization of an oil pump of the system and activation of a valve of the system; and
   a processor configured to perform an auto-set procedure in a first ON cycle, the auto-set procedure comprising:
      outputting a valve ON signal;
      while the valve ON signal is provided, measuring a valve detection signal;
      detecting an oil valve in the fuel oil burner based on the valve detection signal; and
      setting the value for the burner control delay period based on the detecting of the oil valve.

2. The controller of claim 1, wherein the processor is configured to:
   determine whether the oil valve is present during a second ON cycle of the fuel oil burner system; and
   in response to determining that an oil valve is not present, reset the value for the burner control delay period to a default value.

3. The controller of claim 2, wherein the second ON cycle is immediately subsequent to the first ON cycle.

4. The controller of claim 2, wherein the processor is configured to:
   determine that the oil valve is present when a flame is not detected during a burner control delay period of the second ON cycle; and
   determine that the oil valve is not present when a flame is detected within the burner control delay period of the second ON cycle.

5. The controller of claim 4, wherein the processor is configured to disable a failsafe feature associated with the burner control delay period during the second ON cycle.

6. The controller of claim 1, wherein the valve detection signal comprises a current draw of the fuel oil burner.

7. The controller of claim 6, wherein the processor is configured to:
monitor a valve detection signal indicative of current being drawn by the fuel oil burner; and
detect the oil valve when the current draw exceeds a threshold.

8. The controller of claim 1, wherein the processor is configured to:
determine a number of ON cycles that have been performed by the fuel oil burner system; and
refrain from performing the auto-set procedure in response to determining that the fuel oil burner system has performed more than a threshold number of ON cycles.

9. The controller of claim 1, wherein the processor is configured to:
determine whether the auto-set procedure was previously performed; and
refrain from performing the auto-set procedure in response to determining that the auto-set procedure was previously performed.

10. The controller of claim 1, wherein the burner control delay period comprises a valve ON delay period that defines a delay between a time at which the controller provides a motor ON signal and a time at which the controller provides a valve ON signal.

11. The controller of claim 1, wherein the burner control delay period comprises a motor OFF delay period that defines a delay between a time at which the controller provides a valve OFF signal and a time at which the controller provides a motor OFF signal.

12. Computer-readable medium having executable instructions stored thereon, that when executed by a processor, cause the processor to perform functions related to a fuel oil burner, the functions corresponding to:
determining a value for a burner control delay period, the value stored in a memory wherein the burner control delay period is an amount of time the processor waits between energizing an oil pump and activating a valve;
outputting a valve ON signal;
while the valve ON signal is provided, measuring a valve detection signal;
detecting an oil valve in the fuel oil burner based on the valve detection signal; and
setting the value for the burner control delay period based on the detecting of the valve.

13. The computer-readable medium of claim 12, wherein the instructions further comprise instructions that, when executed by the processor, cause the processor to perform functions corresponding to:
determining whether the oil valve is present during a second ON cycle of the fuel oil burner; and
in response to determining that an oil valve is not present, resetting the value for the burner control delay period to a default value.

14. The computer-readable medium of claim 13, wherein the instructions further comprise instructions that, when executed by the processor, cause the processor to perform functions corresponding to:
determining that the oil valve is present when a flame is not detected during a burner control delay period of the second ON cycle;
determining that the oil valve is not present when a flame is detected within the burner control delay period of the second ON cycle; and
in response, disabling a failsafe feature associated with the burner control delay period during the second ON cycle.

15. The computer-readable medium of claim 13, wherein the the valve detection signal comprises a current draw of the fuel oil burner.

16. A processor for a fuel oil burner controller, wherein the processor controls a fuel oil burner to perform intermittent ON cycles and to perform an auto-set procedure in a first ON cycle, the auto-set procedure comprising:
outputting a valve ON signal;
while the valve ON signal is provided, measuring a valve detection signal;
detecting an oil valve in the fuel oil burner based on the valve detection signal; and
setting a value for a burner control delay period based on the detecting of the oil valve, wherein the burner control delay period is an amount of time the processor waits between outputting an oil pump ON signal and outputting a valve ON signal.

17. The processor of claim 16, further configured to:
determine whether the oil valve is present during a second ON cycle of the fuel oil burner; and
in response to determining that an oil valve is not present, reset the stored value for the burner control delay period to a default value.

18. The processor of claim 17, further configured to:
determine that the oil valve is present when a flame is not detected during a burner control delay period of the second ON cycle;
determine that the oil valve is not present when a flame is detected within the burner control delay period of the second ON cycle; and disable a failsafe feature associated with the burner control delay period during the second ON cycle.

19. The processor of claim 16, wherein the valve detection signal comprises a current draw of the fuel oil burner.

20. The processor of claim 16, further configured to:
determine a number of ON cycles that have been performed by the fuel oil burner; and
refrain from performing the auto-set procedure in response to determining that the fuel oil burner has performed more than a threshold number of ON cycles.

21. The processor of claim 16, further configured to:
determine whether the auto-set procedure was previously performed; and
refrain from performing the auto-set procedure in response to determining that the auto-set procedure was previously performed.

* * * * *